(12) United States Patent
Morishita (10) Patent No.: US 8,737,697 B2
(45) Date of Patent: May 27, 2014

(54) FACIAL FEATURE POINT POSITION CORRECTION DEVICE, FACIAL FEATURE POINT POSITION CORRECTING METHOD, AND FACIAL FEATURE POINT POSITION CORRECTING PROGRAM

(75) Inventor: Yusuke Morishita, Tokyo (JP)

(73) Assignee: NEC Corporation, Tokyo (JP)

( * ) Notice: Subject to any disclaimer, the term of this patent is extended or adjusted under 35 U.S.C. 154(b) by 41 days.

(21) Appl. No.: 13/637,732

(22) PCT Filed: May 18, 2011

(86) PCT No.: PCT/JP2011/002766
§ 371 (c)(1),
(2), (4) Date: Sep. 27, 2012

(87) PCT Pub. No.: WO2011/148596
PCT Pub. Date: Dec. 1, 2011

(65) Prior Publication Data
US 2013/0022277 A1    Jan. 24, 2013

(30) Foreign Application Priority Data
May 26, 2010  (JP) ................................. 2010-121017

(51) Int. Cl.
*G06K 9/00* (2006.01)
(52) U.S. Cl.
USPC ........... 382/118; 382/190; 382/195; 382/201; 382/203; 382/209
(58) Field of Classification Search
None
See application file for complete search history.

(56) References Cited

U.S. PATENT DOCUMENTS

| 2007/0071289 A1* | 3/2007 | Takeguchi et al. ............ 382/118 |
| 2009/0116749 A1* | 5/2009 | Cristinacce et al. .......... 382/195 |
| 2009/0220157 A1 | 9/2009 | Kato et al. |
| 2009/0290791 A1* | 11/2009 | Holub et al. .................. 382/164 |

FOREIGN PATENT DOCUMENTS

| JP | 2007-299051 A | 11/2007 |
| JP | 2009-211177 A | 9/2009 |

OTHER PUBLICATIONS

D. Cristinacce, et al., "A Comparison of Shape Constrained Facial Feature Detectors", in 6th International Conference on Automatic Face and Gesture Recognition, 2004, Korea, pp. 357-380.
International Search Report of PCT/JP2011/002766 dated Jun. 14, 2011.

* cited by examiner

*Primary Examiner* — Jason M Repko
*Assistant Examiner* — David Perlman
(74) *Attorney, Agent, or Firm* — Sughrue Mion, PLLC (57) ABSTRACT

Facial feature point reliability generating means generates a reliability map of each facial feature point from a facial image. Initial facial feature point position calculating means calculates the position of each facial feature point in the facial image based on the reliability map. Off-position facial feature point judgment means judges whether or not each facial feature point is an off-position facial feature point not satisfying a prescribed condition. Facial feature point difference calculating means calculates the difference between the position of each facial feature point, excluding those judged as the off-position facial feature points, and the position of a corresponding point of the facial feature point. Facial feature point position correcting means corrects the determined positions of the facial feature points based on the results of the judgment by the off-position facial feature point judgment means and the calculation by the facial feature point difference calculating means.

8 Claims, 8 Drawing Sheets

FACIAL FEATURE POINT POSITION CORRECTION DEVICE, FACIAL FEATURE POINT POSITION CORRECTING METHOD, AND FACIAL FEATURE POINT POSITION CORRECTING PROGRAM

CROSS REFERENCE TO RELATED APPLICATIONS

This application is a National Stage of International Application No. PCT/JP2011/002766 filed May 18, 2011, claiming priority based on Japanese Patent Application No. 2010-121017 filed May 26, 2010, the contents of all of which are incorporated herein by reference in their entirety.

TECHNICAL FIELD

The present invention relates to a facial feature point position correcting device, a facial feature point position correcting method and a facial feature point position correcting program for correcting the positions of feature points of facial organs (eyes, nose, etc.) detected from an image.

BACKGROUND ART

Techniques for detecting the positions (facial feature point positions) of feature points (facial feature points) of facial organs such as the eyes and the nose from an image in which a face was shot (hereinafter referred to as a "facial image") and outputting the detected facial feature point positions are important for conducting face direction estimation, face authentication, facial expressions recognition, etc. with high accuracy. A variety of methods have been proposed in regard to the detection of the facial feature point positions.

For example, Non-patent Literature 1 describing a technique for detecting facial feature points and outputting facial feature point positions has disclosed a method for correcting the detected facial feature point positions based on a statistical face shape model. In this method, facial feature points are detected first by applying facial feature point detectors (each of which has been constructed for each facial feature point) to a facial area, and a reliability map indicating the suitability as a facial feature point is generated for each of the detected facial feature points.

Subsequently, for each facial feature point, a facial feature point position having high reliability and minimizing the difference from a position indicated by a statistical face shape model is searched for based on a prescribed evaluation function. In this process, a penalty is assigned (specifically, no weight is assigned) to facial feature point positions that are far from the corresponding position indicated by the statistical face shape model. Therefore, plausible facial feature point positions can be acquired even when part or all of the facial feature points are hidden (blocked) by something in the facial image (obstruction).

Patent Literature 1 describing a technique for detecting facial feature points and outputting facial feature point positions has disclosed a method for correcting the detected facial feature point positions based on geometrical arrangement (positional relationship). In this method, facial feature points in a facial image are searched for first within a preset search area based on inputted reliability maps, by which initial facial feature point positions are acquired as the result of the search.

The initial facial feature point positions acquired by the search are corrected based on their positional relationship, by executing a statistical geometric constraint process employing eigenspaces. Subsequently, the search area is reset based on the corrected initial facial feature point positions and the search for the facial feature point positions is executed again within the reset search area. Finally, plausible facial feature point positions are acquired by judging the positional reliability of the initial facial feature point positions and that of the facial feature point positions as the result of the second search.

CITATION LIST

Patent Literature

Patent Document 1: JP-A-2009-211177

Non-Patent Literature

Non-patent Literature 1: D. Cristinacce and T. F. Cootes, "A Comparison of Shape Constrained Facial Feature Detectors", in 6th International Conference on Automatic Face and Gesture Recognition 2004, Korea, pp. 357-380

SUMMARY OF INVENTION

Technical Problem

In the method described in the Non-patent Literature 1, when an erroneous reliability map has been generated for one or more facial feature points due to some factor at the time of shooting the facial image (changes in the illumination condition, obstruction, etc.), the position of such a facial feature point is assigned the penalty by the prescribed evaluation function and is corrected to a position close to an average position that is calculated from the face shape model. However, since the calculation with the prescribed evaluation function is executed including also the reliability of such a facial feature point. Therefore there is a problem that affected by the erroneous reliability map, the positions of other facial feature points are shifted.

Meanwhile, in the method described in the Patent Literature 1, when information with low reliability is inputted in regard to one or more facial feature points, the positions of such facial feature points are corrected appropriately based on the geometrical arrangement (positional relationship) as long as the other facial feature point positions have been determined correctly. However, if another failure occurs in the normalization of the position, size and on-screen rotation of the facial area due to an error in the face detection, etc., the facial feature point positions deviate as a whole from a standard face shape expressed as an eigenspace. In this case, it is impossible to judge which ones of the facial feature point positions are deviated from the standard face shape. Consequently, the geometrical arrangement (positional relationship) cannot be calculated appropriately and the facial feature point positions cannot be determined correctly.

It is therefore the primary object of the present invention to provide a facial feature point position correcting device, a facial feature point position correcting method and a facial feature point position correcting program that make it possible to output high-accuracy facial feature point positions even when information with low reliability is inputted in regard to one or more facial feature points.

Solution to Problem

A facial feature point position correcting device in accordance with the present invention comprises: initial facial feature point position calculating means which calculates the positions of facial feature points of organs on a face in an image in which the face was shot, based on reliability maps each of which has been generated for each facial feature point from the image to indicate suitability of a feature point of each facial feature point; off-position facial feature point judgment means which judges whether or not each facial feature point is an off-position facial feature point as a facial feature point not satisfying a prescribed condition specified based on the position of the facial feature point calculated by the initial facial feature point position calculating means and the position of a corresponding point in a statistical face shape model corresponding to the facial feature point; facial feature point difference calculating means which calculates the difference between the position of each facial feature point, excluding those judged as the off-position facial feature points by the off-position facial feature point judgment means, and the position of the corresponding point corresponding to the facial feature point according to a prescribed evaluation function; and facial feature point position correcting means which corrects the determined positions of the facial feature points based on the results of the judgment by the off-position facial feature point judgment means and the calculation by the facial feature point difference calculating means.

A facial feature point position correcting method in accordance with the present invention comprises: calculating the positions of facial feature points of organs on a face in an image in which the face was shot, based on reliability maps each of which has been generated for each facial feature point from the image to indicate suitability of a feature point of each facial feature point; judging whether or not each facial feature point is an off-position facial feature point as a facial feature point not satisfying a prescribed condition specified based on the calculated position of the facial feature point and the position of a corresponding point in a statistical face shape model corresponding to the facial feature point; calculating the difference between the position of each facial feature point, excluding those judged as the off-position facial feature points, and the position of the corresponding point corresponding to the facial feature point according to a prescribed evaluation function; and correcting the determined positions of the facial feature points based on the results of the judgment on whether each facial feature point is an off-position facial feature point or not and the calculation of the difference between the position of each facial feature point and the position of the corresponding point corresponding to the facial feature point.

A facial feature point position correcting program in accordance with the present invention causes a computer to execute: an initial facial feature point position calculating process of calculating the positions of facial feature points of organs on a face in an image in which the face was shot, based on reliability maps each of which has been generated for each facial feature point from the image to indicate suitability of a feature point of each facial feature point; an off-position facial feature point judgment process of judging whether or not each facial feature point is an off-position facial feature point as a facial feature point not satisfying a prescribed condition specified based on the position of the facial feature point calculated by the initial facial feature point position calculating process and the position of a corresponding point in a statistical face shape model corresponding to the facial feature point; a facial feature point difference calculating process of calculating the difference between the position of each facial feature point, excluding those judged as the off-position facial feature points by the off-position facial feature point judgment process, and the position of the corresponding point corresponding to the facial feature point according to a prescribed evaluation function; and a facial feature point position correcting process of correcting the determined positions of the facial feature points based on the results of the judgment by the off-position facial feature point judgment process and the calculation by the facial feature point difference calculating process.

Advantageous Effect of the Invention

According to the present invention, even when information with low reliability is inputted in regard to one or more facial feature points, high-accuracy facial feature point positions can be outputted through the correction of the positions of the facial feature points.

DESCRIPTION OF EMBODIMENT

Figure 1:
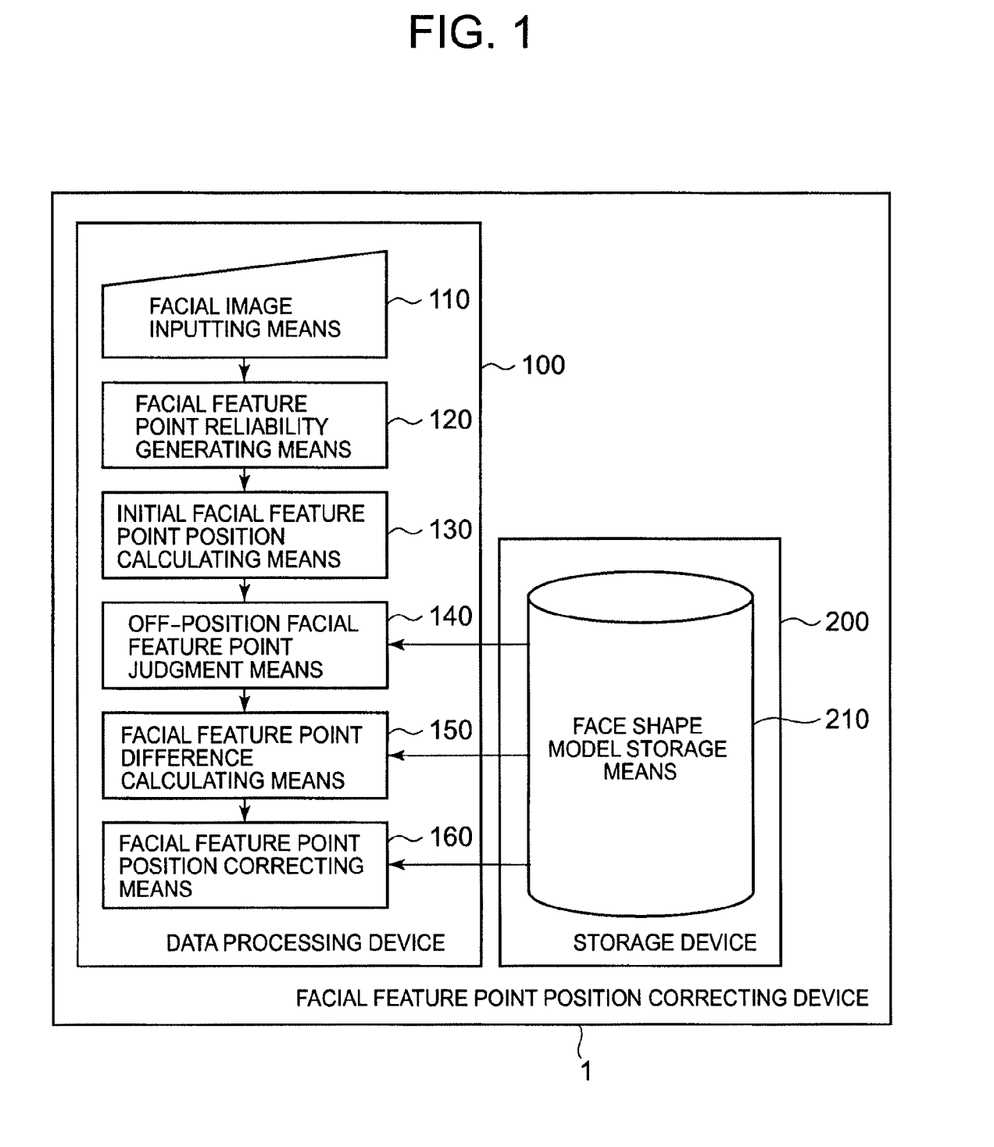
[FIG. 1] It depicts a block diagram showing an example of the configuration of a facial feature point position correcting device in accordance with an exemplary embodiment of the present invention.

Referring now to the drawings, a description will be given in detail of an exemplary embodiment of a facial feature point position correcting device in accordance with the present invention. FIG. 1 is a block diagram showing an example of the configuration of a facial feature point position correcting device in accordance with an exemplary embodiment of the present invention.

As shown in FIG. 1, a facial feature point position correcting device 1 in accordance with the present invention comprises a data processing device 100 and a storage device 200. The data processing device 100 includes facial image inputting means 110, facial feature point reliability generating means 120, initial facial feature point position calculating means 130, off-position facial feature point judgment means 140, facial feature point difference calculating means 150 and facial feature point position correcting means 160. The storage device 200 includes face shape model storage means 210.

The facial image inputting means 110 inputs an image in which a face was shot (facial image). From the facial image inputted by the facial image inputting means 110, the facial feature point reliability generating means 120 generates a reliability map indicating the suitability of a feature point of a facial feature point (eye, nose, etc.), for each facial feature point. The initial facial feature point position calculating means 130 calculates the facial feature point positions (positions of the facial feature points) based on the reliability maps generated by the facial feature point reliability generating means 120. The facial feature point positions calculated by the initial facial feature point position calculating means 130 will hereinafter be referred to as "initial facial feature point positions".

Based on the initial facial feature point positions calculated by the initial facial feature point position calculating means 130, the off-position facial feature point judgment means 140 judges whether or not each facial feature point at each of the initial facial feature point positions is an off-position facial feature point situated at a position that is deviated (off) from a statistical face shape model stored in the face shape model storage means 210. The facial feature point difference calculating means 150 calculates the difference between the position of each facial feature point, excluding those judged by the off-position facial feature point judgment means 140 to be off-position facial feature points, and the position of a corresponding facial feature point (corresponding point) in the statistical face shape model according to a prescribed evaluation function. Based on the results of the judgment by the off-position facial feature point judgment means 140 and the calculation by the facial feature point difference calculating means 150, the facial feature point position correcting means 160 corrects the positions of facial feature points whose positional error from the position of the corresponding facial feature point (in the statistical face shape model stored in the face shape model storage means 210) is large.

Figure 2:
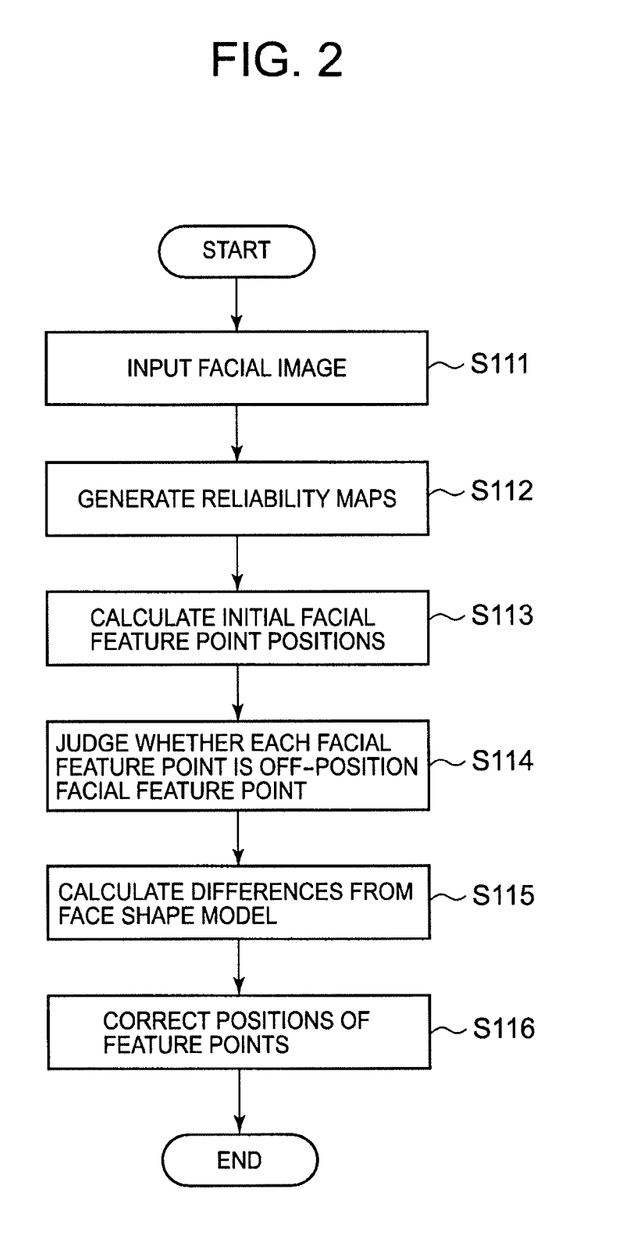
[FIG. 2] It depicts a flow chart showing the operation of the facial feature point position correcting device of the exemplary embodiment.

Next, the operation of the facial feature point position correcting device 1 will be described below referring to figures. FIG. 2 is a flow chart showing the operation of the facial feature point position correcting device 1 shown in FIG. 1.

First, the facial image inputting means 110 inputs an image in which a face was shot (facial image) (step S111). Subsequently, the facial feature point reliability generating means 120 generates the reliability maps indicating the suitability of a feature point of a facial feature point (eye, nose, etc.), from the facial image inputted in the step S111 (step S112). The initial facial feature point position calculating means 130 calculates the initial facial feature point positions based on the reliability maps generated in the step S112 (step S113).

Subsequently, based on the initial facial feature point positions calculated in the step S113, the off-position facial feature point judgment means 140 judges whether each facial feature point at each of the initial facial feature point positions is an off-position facial feature point (situated at a position deviated (off) from the statistical face shape model stored in the face shape model storage means 210) or not (step S114). The facial feature point difference calculating means 150 calculates the difference between the position of each facial feature point, excluding those judged in the step S114 to be off-position facial feature points, and the position of the corresponding facial feature point in the statistical face shape model according to a prescribed evaluation function (step S115). Subsequently, based on the results of the judgment in the step S114 and the calculation in the step S115, the facial feature point position correcting means 160 corrects the positions of feature points whose positional error from the position of the corresponding facial feature point (in the statistical face shape model stored in the face shape model storage means 210) is large (step S116).

According to this exemplary embodiment, the positions of the facial feature points are corrected by excluding facial feature points situated at a position deviated (off) from the position of the corresponding facial feature point in the statistical face shape model from the facial feature points detected from the facial image and calculating the positional difference (error) between each of the (remaining) facial feature points and each corresponding facial feature point in the statistical face shape model according to a prescribed evaluation function. Therefore, facial feature point positions with high accuracy can be outputted.

EXAMPLES

Next, the configuration and operation of the exemplary embodiment in accordance with the present invention will be explained in detail by using some specific examples. In the facial feature point position correcting device 1 of FIG. 1 according to the present invention, the storage device 200 is implemented by a semiconductor memory or a hard disk drive, for example. The facial image inputting means 110 is implemented by a digital camera, for example. The facial image inputting means 110, the facial feature point reliability generating means 120, the initial facial feature point position calculating means 130, the off-position facial feature point judgment means 140, the facial feature point difference calculating means 150 and the facial feature point position correcting means 160 are implemented by, for example, a CPU (Central Processing Unit) executing processes according to program control. The face shape model storage means 210 is implemented by a semiconductor memory or a hard disk drive, for example.

Figure 3:
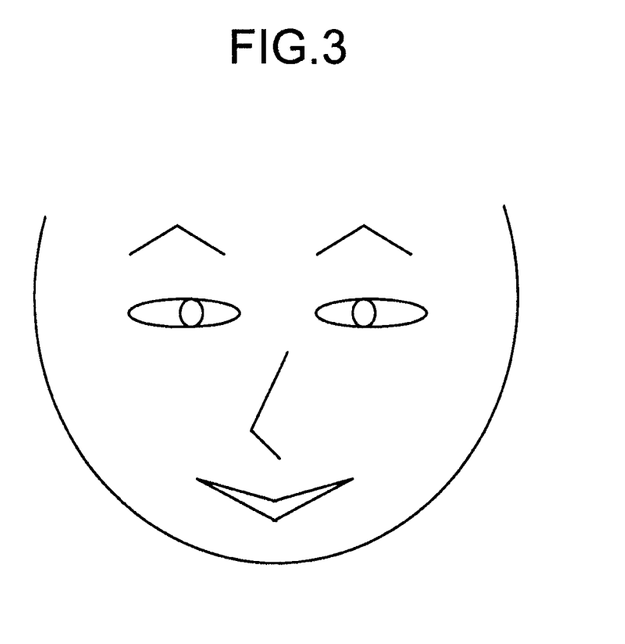
[FIG. 3] It depicts an explanatory drawing showing an example of a facial image (image in which a face was shot) inputted by facial image inputting means.

The facial image inputting means 110 inputs an image in which a face was shot. FIG. 3 is an explanatory drawing showing an example of the facial image (image in which a face was shot) inputted by the facial image inputting means 110. The image inputted by the facial image inputting means 110 may include not only the face but also the background. The facial image inputting means 110 may also be configured to previously execute face detection, extract a facial area (area occupied by the face) from the facial image, and input the extracted facial area to the facial feature point position correcting device 1.

Figure 4:
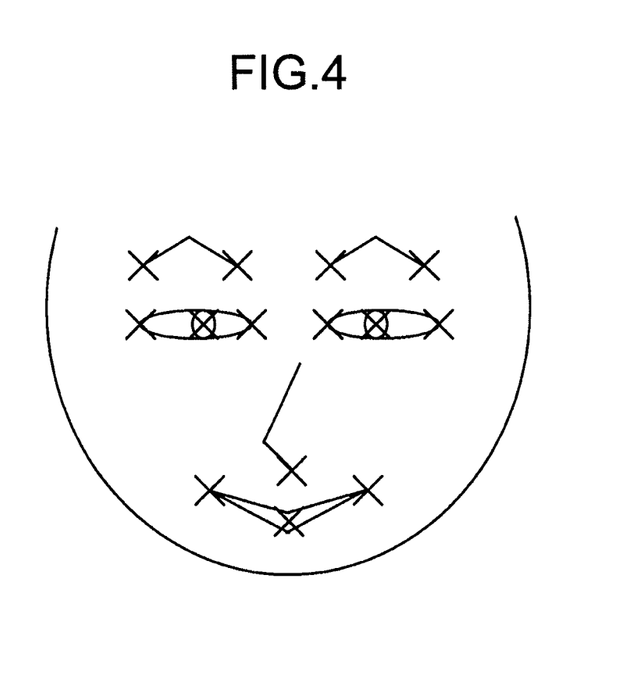
[FIG. 4] It depicts an explanatory drawing showing facial feature points that are desired to be detected in the facial image.

From the facial image inputted by the facial image inputting means 110, the facial feature point reliability generating means 120 generates the reliability map (indicating the suitability of a feature point of a facial feature point (eye, nose, etc.)) for each facial feature point. FIG. 4 is an explanatory drawing showing the facial feature points that are desired to be detected in the facial image. In the example of FIG. 4, the facial feature points that are desired to be detected are indicated with X marks. In this example, a total of fourteen X marks have been put (both ends of each (right, left) eyebrow, the center and both ends of each (right, left) eye, the bottom of the nose, the center and both ends of the mouth) as shown in FIG. 4. In this case, the facial feature point reliability generating means 120 generates fourteen reliability maps corresponding to these points. Various techniques proposed so far can be employed for generating the reliability maps indicating the suitability of a feature point of a facial feature point. For example, the reliability maps may be generated by applying a detector for each facial feature point, constructed by employing the AdaBoost based on the Haar-like features proposed by Viola and Jones, to the whole area of the image inputted by the facial image inputting means 110, similarly to the technique of the Non-patent Literature 1.

Figure 5:
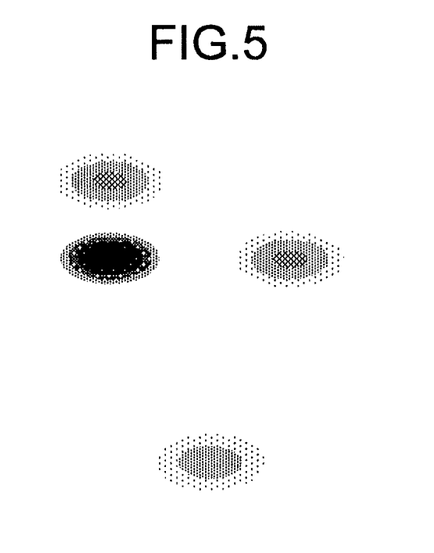
[FIG. 5] It depicts an explanatory drawing showing an example of a reliability map for the pupil center of the right eye.

FIG. 5 is an explanatory drawing showing an example of the reliability map for the pupil center of the right eye. In the example shown in FIG. 5, each point (position) is indicated with darker black with the increase in the reliability representing the suitability as a facial feature point. The example of FIG. 5 indicates that the reliability is high not only around the pupil center of the right eye but also around the pupil center of the left eye, around the right eyebrow, and around the area under the nose.

The initial facial feature point position calculating means 130 calculates the positions of the initial facial feature points based on the reliability maps generated by the facial feature point reliability generating means 120. In this case where positions of the fourteen facial feature points shown in FIG. 14 are desired to be detected, positions of fourteen initial facial feature points are calculated. For example, the initial facial feature point position calculating means 130 determines a position that maximizes the reliability in each reliability map generated by the facial feature point reliability generating means 120 (position where the reliability is the highest) as the position of each initial facial feature point. Besides this method using the maximum reliability position in the reliability map as the position of the initial facial feature point, the initial facial feature point position calculating means 130 may also use a position that maximizes the product of the facial feature point reliability and prior distribution of the facial feature point positions as the position of the initial facial feature point.

Figure 6:
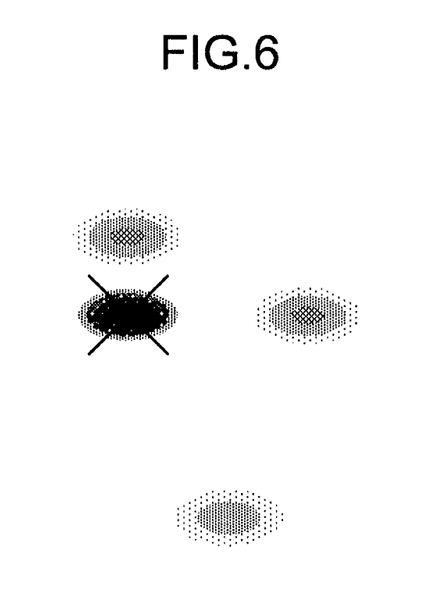
[FIG. 6] It depicts an explanatory drawing indicating a maximum reliability position (position maximizing the reliability) with an X mark in the reliability map around the pupil center of the right eye.

FIG. 6 is an explanatory drawing indicating the maximum reliability position (position maximizing the reliability) with an X mark in the reliability map around the pupil center of the right eye. FIG. 6 indicates that the reliability is high not only around the pupil center of the right eye but also around the pupil center of the left eye, around the right eyebrow, and around the area under the nose. However, FIG. 6 also indicates that the pupil center of the right eye (position indicated with the X mark) has been selected as the position of the initial facial feature point since the reliability is the highest at the pupil center of the right eye.

Based on the positions of the initial facial feature points calculated by the initial facial feature point position calculating means 130, the off-position facial feature point judgment means 140 judges whether or not each facial feature point at each of the initial facial feature point positions is an off-position facial feature point situated at a position deviated (off) from the statistical face shape model stored in the face shape model storage means 210. In the face shape model storage means 210, coordinate values of the fourteen facial feature points shown in FIG. 4 have been prestored as the statistical face shape model.

Incidentally, the coordinate values of the fourteen facial feature points may also be determined as averages of facial feature point coordinate values in a large number of facial images that include individual differences and variations in facial expression and face direction. The face shape model storage means 210 may also prestore a set of coordinate values acquired by applying the k-means method to the facial feature point coordinate values in the large number of facial images (including a variety of variations) as the face shape model. The judgment on whether each facial feature point is an off-position facial feature point (situated at a position deviated (off) from the statistical face shape model) or not may be made by using a robust estimation technique, for example.

Figure 7:
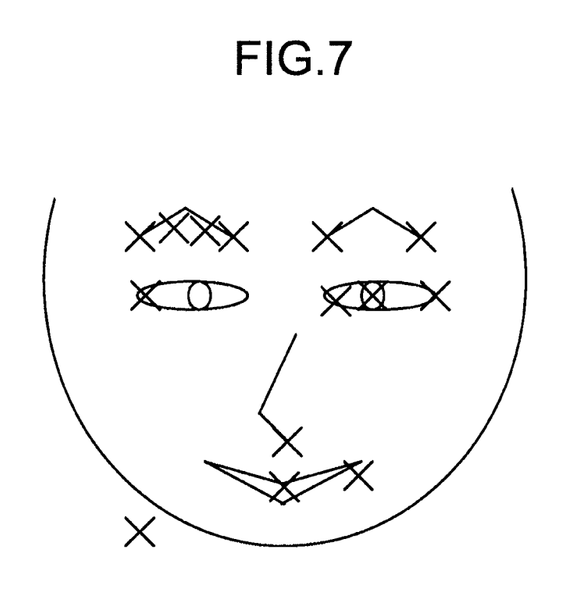
[FIG. 7] It depicts an explanatory drawing showing the positions of initial facial feature points calculated by initial facial feature point position calculating means.

Here, a method for the off-position facial feature point judgment employing the LMedS (Least Median of Squares) method (a type of the robust estimation technique) will be explained referring to figures. FIG. 7 is an explanatory drawing showing the positions of the initial facial feature points calculated by the initial facial feature point position calculating means 130. As shown in FIG. 7, the initial facial feature point position calculating means 130 is assumed here to have calculated the initial facial feature point positions of the pupil center of the right eye, the inner corner of the right eye and the right end of the mouth as positions greatly deviated (off) from the corresponding positions in the facial image (image in which the face was shot) due to some factor at the time of shooting the facial image (e.g., changes in the illumination condition).

Figure 8:
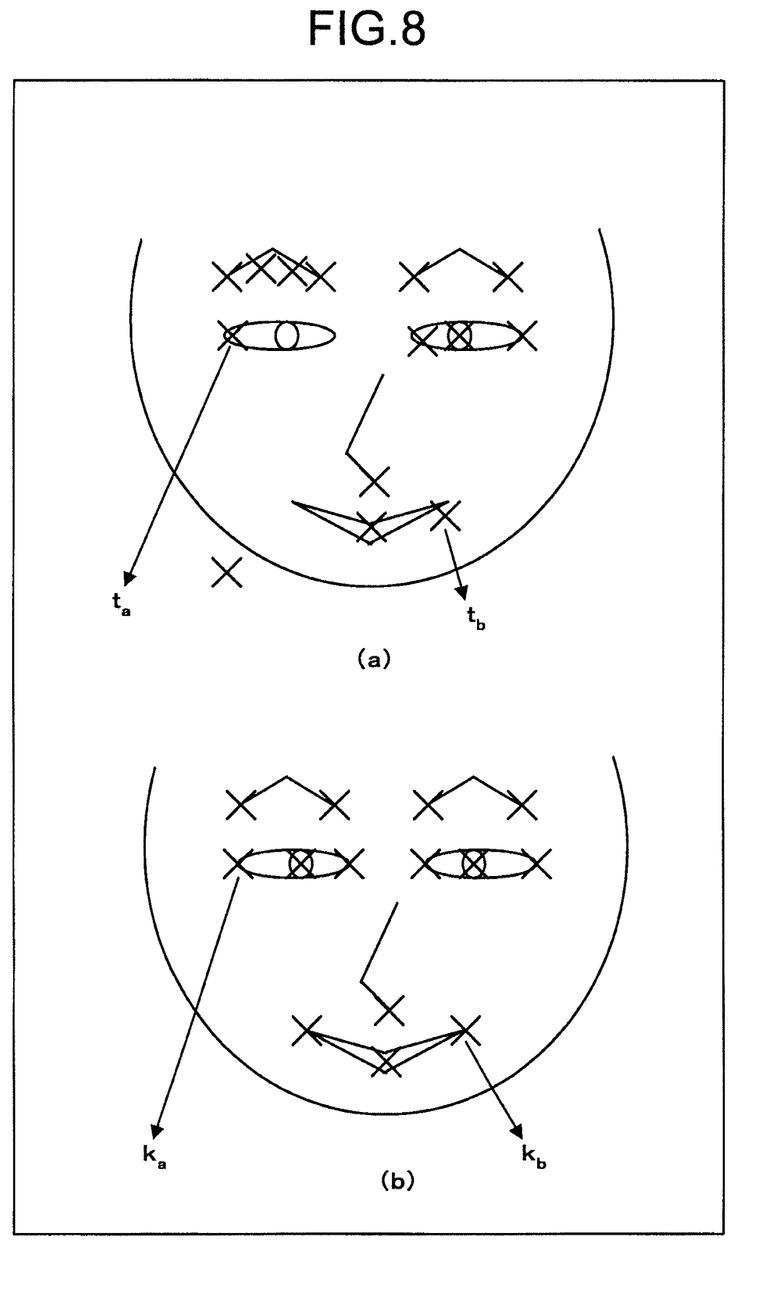
[FIG. 8] It depicts an explanatory drawing showing an example of two facial feature points selected randomly.

The off-position facial feature point judgment means 140 first selects two facial feature points randomly from the fourteen facial feature points shown in FIG. 4. FIG. 8 is an explanatory drawing showing an example of the two facial feature points selected randomly. The example of FIG. 8(a) indicates that a facial feature point of the outer corner of the right eye and a facial feature point of the left end of the mouth have been selected.

The following explanation will be given by assigning a character "a" or "b" to each facial feature point selected by the off-position facial feature point judgment means 140. In the input image, a set of coordinate values of initial facial feature points corresponding to the two randomly selected facial feature points is defined as $(t_a, t_b)$. Each symbol $t_a$, $t_b$ denotes a two-dimensional vector representing coordinate values in the input image. Further, in the statistical face shape model stored in the face shape model storage means 210, a set of coordinate values of two facial feature points corresponding to the facial feature points selected by the off-position facial feature point judgment means 140 (the point at the outer corner of the right eye and the point at the left end of the mouth in this example), that is, a set of coordinate values of a point at the outer corner of the right eye and a point at the left end of the mouth in the face shape model, is defined as $(k_a, k_b)$ as shown in FIG. 8(b). Each symbol $k_a$, $k_b$ denotes a two-dimensional vector representing coordinate values in the face shape model.

Since the coordinate system for the facial feature points in the face shape model and the coordinate system for the initial facial feature points differ from each other, it is necessary to associate the coordinate values in the former coordinate system and the coordinate values in the latter coordinate system with each other. Therefore, the off-position facial feature point judgment means 140 determines a coordinate transformation p from the coordinate value set $(t_a, t_b)$ of the initial facial feature points to the coordinate value set $(k_a, k_b)$ in the face shape model. The coordinate transformation p is a four-dimensional vector that includes a translational component in the x-axis direction, a translational component in the y-axis direction, a rotational component in the on-screen directions, and a scale component. Subsequently, the off-position facial feature point judgment means 140 calculates the square errors between the coordinate values of the remaining twelve initial facial feature points after being transformed by use of the coordinate transformation p and the coordinate values of twelve facial feature points in the face shape model corresponding to the twelve initial facial feature points and then determines the median of the twelve square errors according to the following expression (1):

$$\operatorname*{med}_{j \neq a,b} \|p(t_j) - k_j\| \qquad \text{expression (1)}$$

The symbol "med" in the above expression (1) represents a function for calculating the median. The off-position facial feature point judgment means 140 executes the above sequence (randomly selecting two facial feature points, determining the coordinate transformation p, and calculating the square errors of the coordinate values) multiple times. Then, the off-position facial feature point judgment means 140 holds a coordinate transformation p minimizing the median of the square errors as a coordinate transformation p'. Finally, the off-position facial feature point judgment means 140 makes the judgment on whether each facial feature point is an off-position facial feature point or not. Specifically, a facial feature point is judged to be an off-position facial feature point if the square error between the coordinate values of the initial facial feature point after the transformation by the coordinate transformation p' and the coordinate values in the face shape model is greater than a prescribed threshold value.

Figure 9:
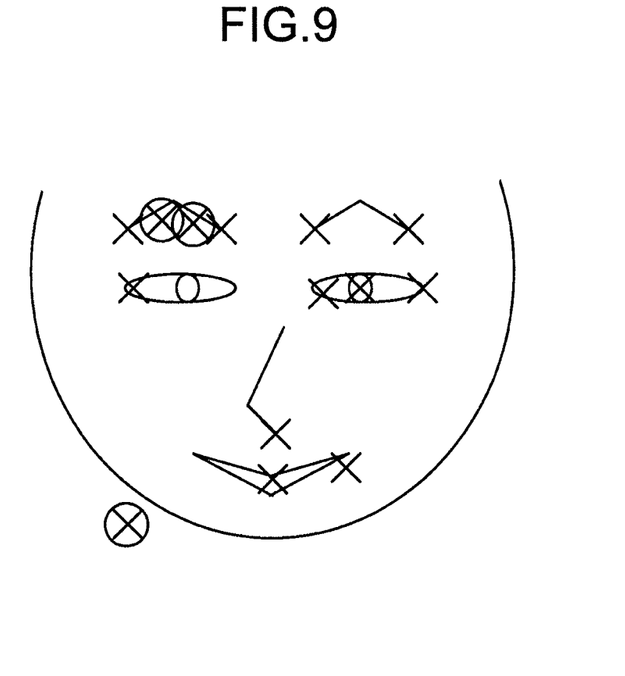
[FIG. 9] It depicts an explanatory drawing showing an example of the result of a judgment by off-position facial feature point judgment means.

FIG. 9 is an explanatory drawing showing an example of the result of the judgment by the off-position facial feature point judgment means 140. In FIG. 9, each facial feature point judged by the off-position facial feature point judgment means 140 as an off-position facial feature point is indicated with an X mark surrounded by a circle. FIG. 9 indicates that the initial facial feature points for the pupil center of the right eye, the inner corner of the right eye and the right end of the mouth have been judged as the off-position facial feature points.

Incidentally, the number of facial feature points randomly selected by the off-position facial feature point judgment means 140 for determining the coordinate transformation p may also be three or more. For example, a case where the off-position facial feature point judgment means 140 randomly selects three facial feature points from the fourteen facial feature points shown in FIG. 4 will be explained briefly here by assigning a character "a", "b" or "c" to each facial feature point selected by the off-position facial feature point judgment means 140. In the input image, a set of coordinate values of three initial facial feature points corresponding to the three randomly selected facial feature points is defined as $(t_a, t_b, t_c)$. Further, in the statistical face shape model stored in the face shape model storage means 210, a set of coordinate values of three facial feature points corresponding to the facial feature points selected by the off-position facial feature point judgment means 140 is defined as $(k_a, k_b, k_c)$.

The off-position facial feature point judgment means 140 determines a coordinate transformation p that minimizes the square errors between the other coordinate values (coordinate values of the remaining facial feature points) in the face shape model and the coordinate values of initial facial feature points corresponding to the former coordinate values in the coordinate transformations from a coordinate value set $(t_a, t_b, t_c)$ of initial facial feature points to a coordinate value set $(k_a, k_b, k_c)$ in the face shape model. Thereafter, the off-position facial feature point judgment means 140 can make the judgment on whether each facial feature point is an off-position facial feature point or not similarly to the case where the number of the randomly selected facial feature points is two.

The facial feature point difference calculating means 150 calculates the difference between the position of each facial feature points, excluding those judged as the off-position facial feature points by the off-position facial feature point judgment means 140, and the position of the corresponding facial feature point in the statistical face shape model according to a prescribed evaluation function.

For example, the facial feature point difference calculating means 150 determines a coordinate transformation p from the coordinate values of the initial facial feature points, excluding those judged as the off-position facial feature points by the off-position facial feature point judgment means 140, to the coordinate values of the facial feature points corresponding to the initial facial feature points in the face shape model by means of the least squares method. Thereafter, the facial feature point difference calculating means 150 may use the square error between the coordinate values of each initial facial feature point after the transformation by the coordinate transformation p and the coordinate values in the face shape model as the difference between the position of each facial feature point (excluding those judged as the off-position facial feature points) and the position of the facial feature point in the statistical face shape model. The facial feature point difference calculating means 150 may also substitute the coordinate transformation p' (determined by the off-position facial feature point judgment means 140) for the above coordinate transformation p. Besides the square error between the transformed coordinate values of each initial facial feature points and the coordinate values in the face shape model, the facial feature point difference calculating means 150 may also use the facial feature point reliability at the coordinates of each initial facial feature point, for example.

In the case where the facial feature point reliability is used, the facial feature point difference calculating means 150 may, for example, calculate the product of the inverse (reciprocal number) of the facial feature point reliability and the square error between the transformed coordinate values of the initial facial feature point and the coordinate values in the face shape model and output the product as the error between the transformed coordinate values of the initial facial feature point and the coordinate values in the face shape model.

Based on the results of the judgment by the off-position facial feature point judgment means 140 and the calculation by the facial feature point difference calculating means 150, the facial feature point position correcting means 160 corrects the positions of facial feature points whose error from the statistical face shape model is large. The facial feature points that undergo the positional correction by the facial feature point position correcting means 160 are those judged as the off-position facial feature points by the off-position facial feature point judgment means 140 and those whose positional error (from the position in the face shape model) calculated by the facial feature point difference calculating means 150 is a prescribed threshold value or greater.

The facial feature point position correcting means 160 may use, for example, the face shape model stored in the face shape model storage means 210 for the correction of the facial feature points. Specifically, the facial feature point position correcting means 160 can determine the corrected coordinate values of the facial feature points deviated from the face shape model (facial feature points as the targets of the correction) by transforming the coordinate values of the corresponding facial feature points in the face shape model (corresponding to the correction-target facial feature points) by using the inverse transformation p⁻ of the coordinate transformation p determined by the facial feature point difference calculating means 150.

Figure 10:
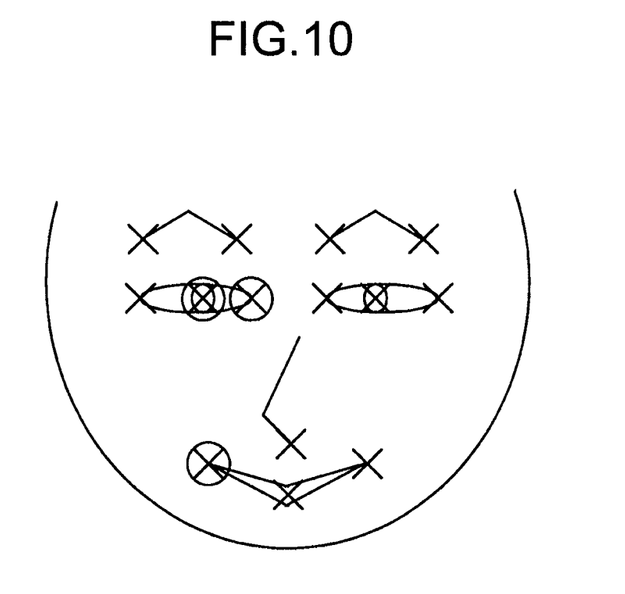
[FIG. 10] It depicts an explanatory drawing showing an example of the result of positional correction of facial feature points deviated from a face shape model conducted by facial feature point position correcting means.

FIG. 10 is an explanatory drawing showing an example of the result of the positional correction of the facial feature points deviated from the face shape model conducted by the facial feature point position correcting means 160. FIG. 10 indicates that the positions of the facial feature points of the pupil center of the right eye, the inner corner of the right eye and the right end of the mouth, which have been judged as the off-position facial feature points in FIG. 9, have been corrected to appropriate positions.

According to this exemplary embodiment, facial feature point positions with high accuracy can be outputted through the positional correction of the facial feature points, judged to be situated at positions deviated from the positions of the corresponding facial feature points in the statistical face shape model, to appropriate positions.

Figure 11:
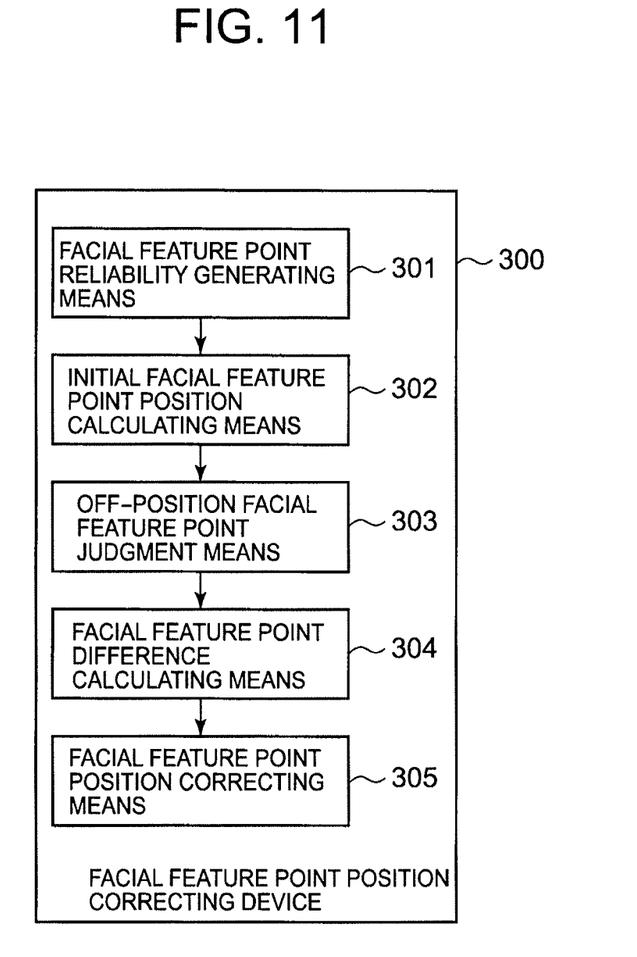
[FIG. 11] It depicts a block diagram showing the outline of the present invention.

Next, the outline of the present invention will be explained. FIG. 11 is a block diagram showing the outline of the present invention. As shown in FIG. 11, the facial feature point position correcting device 300 in accordance with the present invention comprises facial feature point reliability generating means 301, initial facial feature point position calculating means 302, off-position facial feature point judgment means 303, facial feature point difference calculating means 304 and facial feature point position correcting means 305.

The facial feature point reliability generating means 301 generates a reliability map indicating suitability of a feature point of a facial feature point which indicates a feature point of an organ on a face, for each facial feature point from an input image in which the face was shot. The initial facial feature point position calculating means 302 calculates the positions of the facial feature points in the image in which the face was shot, based on the reliability maps generated by the facial feature point reliability generating means 301. The off-position facial feature point judgment means 303 judges whether or not each facial feature point is an off-position facial feature point as a facial feature point not satisfying a prescribed condition specified based on the position of the facial feature point calculated by the initial facial feature point position calculating means 302 and the position of a corresponding point in a statistical face shape model corresponding to the facial feature point.

The facial feature point difference calculating means 304 calculates the difference between the position of each facial feature point, excluding those judged as the off-position facial feature points by the off-position facial feature point judgment means 303, and the position of the corresponding point corresponding to the facial feature point according to a prescribed evaluation function. The facial feature point position correcting means 305 corrects the determined positions of the facial feature points based on the results of the judgment by the off-position facial feature point judgment means 303 and the calculation by the facial feature point difference calculating means 304.

Such a configuration makes it possible to output high-accuracy facial feature point positions through the correction of the positions of the facial feature points even when an image in which the reliability of one or more facial feature points is low (e.g., unclear image) has been inputted due to some factor at the time of shooting the facial image (changes in the illumination condition, obstruction, etc.)

The following facial feature point position correcting devices (1) to (4) have also been disclosed in the above exemplary embodiment:

(1) The facial feature point position correcting device wherein the off-position facial feature point judgment means 303 makes the judgment on whether each facial feature point is an off-position facial feature point or not by using a robust estimation technique.

(2) The facial feature point position correcting device wherein the off-position facial feature point judgment means 303 repeats:

an operation of randomly selecting some facial feature points from the facial feature points;

an operation of transforming coordinate values representing the positions of the facial feature points not selected by the selecting operation based on a vector for transforming coordinate values representing the positions of the selected facial feature points into coordinate values representing the positions of the corresponding points of the facial feature points; and an operation of calculating the median of the square errors between the coordinate values after the transformation and the coordinate values representing the positions of the corresponding points of the facial feature points, and judges that a facial feature point is an off-position facial feature point if the square error between the coordinate values representing the position of the corresponding point of the facial feature point and the coordinate values of the facial feature point transformed based on a vector minimizing the median among the vectors used for the coordinate value transformation in the repeated operations is greater than a prescribed threshold value.

(3) The facial feature point position correcting device comprising face shape model storage means which stores information on the statistical face shape model.

(4) The facial feature point position correcting device wherein the facial feature point position correcting means 305 executes the correction of the position for facial feature points judged as the off-position facial feature points by the off-position facial feature point judgment means 303 and for facial feature points whose difference as the result of the calculation by the facial feature point difference calculating means 304 is a preset threshold value or greater.

While the present invention has been described above with reference to the exemplary embodiment and examples, the present invention is not to be restricted to the particular illustrative exemplary embodiment and examples. A variety of modifications understandable to those skilled in the art can be made to the configuration and details of the present invention within the scope of the present invention.

INDUSTRIAL APPLICABILITY

The present invention is widely applicable to the accuracy improvement of face direction estimation and face authentication systems, facial expressions recognition, etc.

REFERENCE SIGNS LIST 1, 300 Facial feature point position correcting device
100 Data processing device
110 Facial image inputting means
120, 301 Facial feature point reliability generating means
130, 302 Initial facial feature point position calculating means
140, 303 Off-position facial feature point judgment means
150, 304 Facial feature point difference calculating means
160, 305 Facial feature point position correcting means
200 Storage means
210 Face shape model storage means

The invention claimed is:

1. A facial feature point position correcting device, comprising:

an initial facial feature point position calculating unit which calculates the positions of facial feature points of organs on a face in an image in which the face was shot, based on reliability maps each of which has been generated for each facial feature point from the image to indicate suitability of a feature point of each facial feature point;

an off-position facial feature point judgment unit which judges whether or not each facial feature point is an off-position facial feature point as a facial feature point not satisfying a prescribed condition specified based on the position of the facial feature point calculated by the initial facial feature point position calculating unit and based on the position of a corresponding point in a statistical face shape model corresponding to the facial feature point;

a facial feature point difference calculating unit which calculates the difference between the position of each facial feature point, excluding those judged as the off-position facial feature points by the off-position facial feature point judgment unit, and the position of the corresponding point corresponding to the facial feature point according to a prescribed evaluation function; and a facial feature point position correcting unit which corrects the determined positions of the facial feature points based on the results of the judgment by the off-position facial feature point judgment unit and the calculation by the facial feature point difference calculating unit.

2. The facial feature point position correcting device according to claim 1, wherein the off-position facial feature point judgment unit makes the judgment on whether each facial feature point is an off-position facial feature point or not by using a robust estimation technique.

3. The facial feature point position correcting device according to claim 2, wherein the off-position facial feature point judgment unit repeats:

an operation of randomly selecting some facial feature points from the facial feature points;

an operation of transforming coordinate values representing the positions of the facial feature points not selected by the selecting operation based on a parameter for transforming coordinate values representing the positions of the selected facial feature points into coordinate values representing the positions of the corresponding points of the facial feature points; and an operation of calculating the median of the errors between the coordinate values after the transformation and the coordinate values representing the positions of the corresponding points of the facial feature points, and judges that a facial feature point is an off-position facial feature point if the error between the coordinate values representing the position of the corresponding point of the facial feature point and the coordinate values of the facial feature point transformed based on a parameter minimizing the median among the parameters used for the coordinate value transformation in the repeated operations is greater than a prescribed threshold value.

4. The facial feature point position correcting device according to claim 1, comprising a face shape model storage unit which stores information on the statistical face shape model.

5. The facial feature point position correcting device according to claim 1, wherein the facial feature point position correcting unit executes the correction of the position for facial feature points judged as the off-position facial feature points by the off-position facial feature point judgment unit and for facial feature points whose difference as the result of the calculation by the facial feature point difference calculating unit is a preset threshold value or greater.

6. A facial feature point position correcting method, comprising:

calculating the positions of facial feature points of organs on a face in an image in which the face was shot, based on reliability maps each of which has been generated for each facial feature point from the image to indicate suitability of a feature point of each facial feature point;

judging whether or not each facial feature point is an off-position facial feature point as a facial feature point not satisfying a prescribed condition specified based on the calculated position of the facial feature point and based on the position of a corresponding point in a statistical face shape model corresponding to the facial feature point;

calculating the difference between the position of each facial feature point, excluding those judged as the off-position facial feature points, and the position of the corresponding point corresponding to the facial feature point according to a prescribed evaluation function; and correcting the determined positions of the facial feature points based on the results of the judgment on whether each facial feature point is an off-position facial feature point or not and the calculation of the difference between the position of each facial feature point and the position of the corresponding point corresponding to the facial feature point.

7. A non-transitory computer readable information recording medium storing a facial feature point position correcting program, when executed by a processor, performs a method for:

calculating the positions of facial feature points of organs on a face in an image in which the face was shot, based on reliability maps each of which has been generated for each facial feature point from the image to indicate suitability of a feature point of each facial feature point;

judging whether or not each facial feature point is an off-position facial feature point as a facial feature point not satisfying a prescribed condition specified based on the position of the facial feature point calculated by the initial facial feature point position calculating process and based on the position of a corresponding point in a statistical face shape model corresponding to the facial feature point;

calculating the difference between the position of each facial feature point, excluding those judged as the off-position facial feature points by the off-position facial feature point judgment process, and the position of the corresponding point corresponding to the facial feature point according to a prescribed evaluation function; and correcting the determined positions of the facial feature points based on the results of the judgment by the off-position facial feature point judgment process and the calculation by the facial feature point difference calculating process.

8. The facial feature point position correcting device according to claim 1, comprising a facial feature point reliability generating unit which generates the reliability map for each facial feature point from the input image in which the face was shot, wherein the initial facial feature point position calculating unit calculates the position of each facial feature point in the image in which the face was shot, based on the reliability map generated by the facial feature point reliability generating unit.

* * * * *